US012794725B2

(12) United States Patent
Rensfelt et al.

(10) Patent No.: US 12,794,725 B2
(45) Date of Patent: Nov. 10, 2026

(54) AUTOMATED TESTING SYSTEM FOR A VIDEO CONFERENCING SYSTEM

(71) Applicant: Google LLC, Mountain View, CA (US)

(72) Inventors: Karl Olof Rensfelt, Stockholm (SE); Ridwaan Daniel Carregosa, Stockholm (SE); Claes Erik Olof Malmnäs, Stockholm (SE); Paul Hallak, Solna (SE); Doudou Mazala Kisabaka, Stockholm (SE)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/397,937

(22) Filed: Dec. 27, 2023

(65) Prior Publication Data

US 2024/0146562 A1 May 2, 2024

Related U.S. Application Data

(63) Continuation of application No. 17/740,450, filed on May 10, 2022, now Pat. No. 11,894,940.

(51) Int. Cl.
*H04L 12/18* (2006.01)
*G06F 11/34* (2006.01)

(52) U.S. Cl.
CPC ...... *H04L 12/1827* (2013.01); *G06F 11/3452* (2013.01); *H04L 12/1831* (2013.01)

(58) Field of Classification Search
CPC ..... H04H 20/12; H04M 3/567; H04L 65/403; H04L 47/805; H04N 21/2662
See application file for complete search history.

(56) References Cited

U.S. PATENT DOCUMENTS 9,591,300 B2 3/2017 Djurdjevic
10,582,057 B2 3/2020 Konig et al.
(Continued)

FOREIGN PATENT DOCUMENTS

WO WO 2013/044997 4/2013
WO WO 2021/051031 3/2021

OTHER PUBLICATIONS

International Preliminary Report on Patentability for PCT/US2023/021677, mailed on Nov. 21, 2024, 12 pages.
(Continued)

*Primary Examiner* — John A Follansbee
*Assistant Examiner* — Christopher P Cadorna
(74) *Attorney, Agent, or Firm* — DORITY & MANNING, P.A.

(57) ABSTRACT

Techniques for improving performance in a video conferencing system by using an automated testing system are described herein. The testing system can receive a request, from a user, for a meeting bot to participate in a video conference being hosted by a video conferencing system. The meeting bot. The system can select a first meeting bot from a plurality of meeting bots. Additionally, the system can grant access control of the first meeting bot to the user. Moreover, the system can obtain, from the first meeting bot, metrics data of the first meeting bot that is associated with performance of the video conference. Furthermore, the system can calculate a performance value based on the metrics data of the first meeting bot. Subsequently, the system can perform a task based on the performance value.

19 Claims, 6 Drawing Sheets

(56) References Cited

U.S. PATENT DOCUMENTS

| | | | | |
|---|---|---|---|---|
| 11,101,906 | B1 | 8/2021 | Jiang et al. | |
| 2020/0351405 | A1 | 11/2020 | Pace | |
| 2021/0294710 | A1 | 9/2021 | Hicks et al. | |
| 2022/0385494 | A1 | 12/2022 | Balaji et al. | |
| 2023/0222044 | A1* | 7/2023 | Arveti | G06F 11/3055 717/168 |
| 2023/0344965 | A1* | 10/2023 | O'Connell | H04B 17/318 |

OTHER PUBLICATIONS

International Search Report and Written Opinion for Application No. PCT/US2023/021677, mailed Aug. 3, 2023, 16 pages.

* cited by examiner

AUTOMATED TESTING SYSTEM FOR A VIDEO CONFERENCING SYSTEM

PRIORITY CLAIM

The present application is a continuation of U.S. application Ser. No. 17/740,450, having a filing date of May 10, 2022, which is incorporated by reference herein.

FIELD

The present disclosure relates generally to video conferencing technology. More particularly, the present disclosure relates to improving the performance of a video conferencing system by using an automated testing system.

BACKGROUND

Video conferencing technologies, sometimes alternatively referred to as video conferencing systems, video teleconference, video calls, or video telephony (all of which are hereafter referred to generally as "video conferencing"), include technologies for the reception and transmission of audio and/or visual signals by users in different locations, for communication between people in real time. Often, there are many participants that are participating in a video conference that communicate with each other by using a display screen (e.g., visual and/or audio data from participants, presented content, shared content).

However, in existing video conferencing technologies, as more participants join and interact in a video conference, the experience of a participant in the video conference may be degraded. As such, participants may struggle to communicate with each other during the video conference. This struggle within a videoconference can lead to misunderstanding, fatigue, interruption, being unintentionally removed from the video conference, and so on. Each of these drawbacks can lead to longer video conferences which can lead to an increased use of computational resources such as processor usage, memory usage, network bandwidth.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for improving performance in a video conferencing system. The method can include receiving, by a computing system comprising one or more computing devices, a request from an application program interface (API) user for one or more meeting bots to participate in a video conference being hosted by a video conferencing system. The one or more meeting bots can be emulated meeting participants configured to send recorded audio or video data in the video conference. The method can further include selecting, by the computing system and in response to the request, a first meeting bot from a plurality of meeting bots. Additionally, the method can include granting, by the computing system, access control of the first meeting bot to the API user, where the API user can be enabled to control the first meeting bot in the video conference. Moreover, the method can include obtaining, by the computing system and from the first meeting bot, metrics data of the first meeting bot that is associated with performance of the video conference. Furthermore, the method can include calculating, by the computing system, a performance value based on the metrics data of the first meeting bot. Subsequently, the method can include performing, by the computing system, a task based on the performance value.

In some implementations, the task performed can include sending a report to a developer of the video conferencing system.

In some implementations, the task performed can include sending an alert to a developer of the video conferencing system when the performance value exceeds a threshold.

In some implementations, the task performed can include updating one or more parameters of the video conferencing system based on the performance value and the metrics data.

In some implementations, the task performed can include storing the metrics data in a metrics database. Additionally, the task performed can further include granting access to the metrics database to a developer of the video conferencing system.

In some implementations, the method can further include receiving, from the API user, a second request for a second meeting bot to participate in the video conference. Additionally, the method can further include selecting, in response to the second request, a second meeting bot from a plurality of meeting bots. Moreover, the method can further include granting access control of the second meeting bot to the API user, where the API user is enabled to control the second meeting bot in the video conference. Moreover, the method can further include obtaining, from the second meeting bot, metrics data of the second meeting bot that is associated with performance of the video conference. Furthermore, the performance value can be further calculated or updated based on the metrics data of the second meeting bot.

In some implementations, the metrics data can include media statistics data that describes a quality of audio data and a quality of video data received by the first meeting bot. For example, the media statistics data can include an audio bitrate of the video conference, a resolution setting of the video conference, a frames-per-second (FPS) rate of the video conference, and/or a video bitrate of the video conference.

In some implementations, the metrics data can include API query data that describes an amount of time for the first meeting bot to perform an action in the video conference. For example, the API query data can include an amount of time for the first meeting bot to send a chat message to another meeting participant in the video conference, an amount of time for the first meeting bot to send a notification (e.g., raise their hands) in the video conference, or an amount of time for the first meeting bot to join the video conference, an amount of time for the second meeting bot to join the video conference.

In some implementations, the API user is an automated choreographer that runs recurring tests of the video conferencing system.

In some implementations, the API user is a developer of the video conferencing system that is testing a feature for the video conferencing system.

In some implementations, the request includes a computer attribute of the first meeting bot. Additionally, the first meeting bot can be selected from the plurality of meeting bots based on the computer attribute.

In some implementations, the request includes a network attribute associated with a network connection of the first meeting bot. Additionally, the first meeting bot can be selected from the plurality of meeting bots based on the network attribute.

Another example aspect of the present disclosure is directed to a computing system having one or more processors. The computing system includes one or more non-transitory, computer-readable media that store instructions that when executed by the one or more processors cause the computing system to perform operations. The operations can include receiving, by the computing system, a request from an application program interface (API) user for one or more meeting bots to participate in a video conference being hosted by a video conferencing system. The one or more meeting bots can be emulated meeting participants configured to send recorded audio or video data in the video conference. Additionally, the operations can include selecting, by the computing system and in response to the request, a first meeting bot from a plurality of meeting bots. Moreover, the operations include granting, by the computing system, access control of the first meeting bot to the API user, wherein the API user is enabled to control the first meeting bot in the video conference. Furthermore, the operations include obtaining, by the computing system and from the first meeting bot, metrics data of the first meeting bot that is associated with performance of the video conference. The operations can include calculating, by the computing system, a performance value based on the metrics data of the first meeting bot. Subsequently, the operations can include performing, by the computing system, a task based on the performance value.

Another example aspect of the present disclosure is directed to one or more non-transitory computer-readable media that store instructions that, when executed by one or more processors of a computing system, cause the computing system to perform operations. The operations include receiving a request from an application program interface (API) user for one or more meeting bots to participate in a video conference being hosted by a video conferencing system. The one or more meeting bots can be emulated meeting participants configured to send recorded audio or video data in the video conference. The operations can include selecting, in response to the request, a first meeting bot from a plurality of meeting bots. Additionally, the operations can include granting access control of the first meeting bot to the API user, wherein the API user is enabled to control the first meeting bot in the video conference. Moreover, the operations can include obtaining, from the first meeting bot, metrics data of the first meeting bot that is associated with performance of the video conference. Furthermore, the operations can include calculating a performance value based on the metrics data of the first meeting bot. Subsequently, the operations can include performing a task based on the performance value.

Other aspects of the present disclosure are directed to various systems, apparatuses, non-transitory computer-readable media, user interfaces, and electronic devices. These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
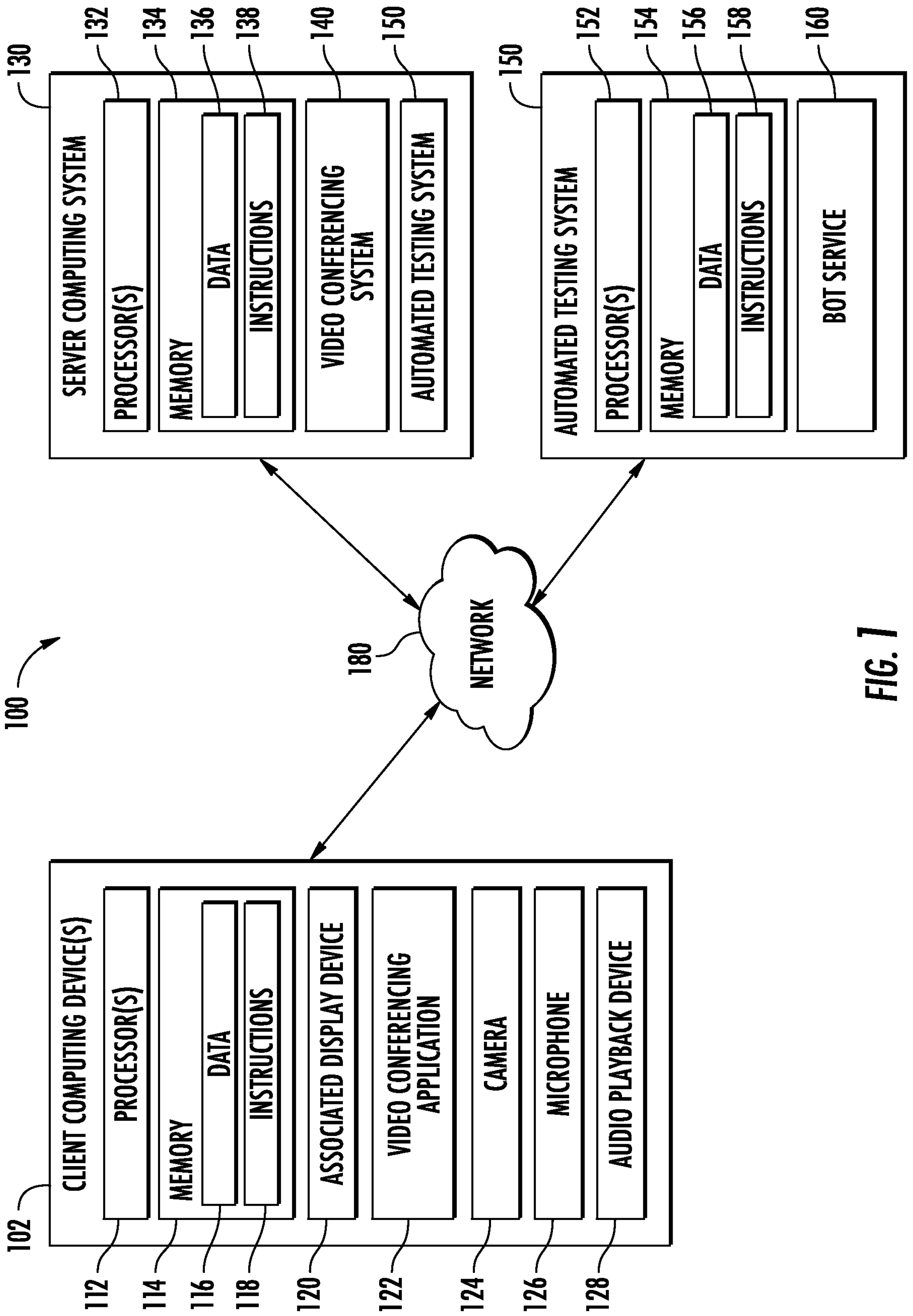
FIG. 1 depicts a block diagram of an example computing system according to example embodiments of the present disclosure.

Reference numerals that are repeated across plural figures are intended to identify the same features in various implementations.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally, the present disclosure is directed to an automated testing system to improve the performance of a video conferencing system. More particularly, the automated testing system coordinates and manages meeting bots to participate in a video conference being hosted by the video conferencing meeting. The automated testing system can highlight potential vulnerabilities of the video conferencing system in order to improve the performance of the video conferencing system. In some instances, the automated testing system can receive, from an application program interface (API) user, a request for one or more meeting bots to participate in the video conference. For example, the API user can be an automated choreographer that runs recurring tests of the video conferencing system or a developer of the video conferencing system that is testing a feature for the video conferencing system. The one or more meeting bots can be emulated meeting participants configured to send recorded or computer-generated audio or video data in the video conference. Based on the request, the automated testing system can select a first meeting bot from a plurality of meeting bots. The first meeting bot can be selected based on the configuration requested by the API user. The automated testing system can then give the API user access control of the first meeting bot. By having access control, it enables the API user to control the first meeting bot in the video conference. Additionally, the first meeting bot can transmit metrics data associated with the performance of the video conference to the automated testing system. The automated testing system can calculate a performance value based on the received metrics data, and perform a task based on the performance value. For example, an alert can be sent to a developer if the performance value exceeds a specific threshold.

In some implementations, performance of a video conferencing application for a meeting can be dependent on actions performed by participants in the meeting. For example, in a large meeting, the video conferencing application determines which participants are currently visible to other participants based on a determination on different factors (e.g., which participants are speaking), which can change over time. Therefore, to verify system performance and correctness, the automated testing system enables control of participant behavior in system level tests. For such tests, the automated testing system uses emulated meeting participants, which can also be referred as meeting bots. A meeting bot can be a headless client that sends media from provided audio and video recordings instead of a mic and camera. The meeting bot can also create computer-generated media streams (e.g., audio, image, and/or video streams). The meeting bots can, in addition to sending and receiving media streams, perform video conferencing actions, such as, but not limited to, muting, unmuting, sending chat messages, receiving chat messages, raising a hand. The meeting bots can also serve as probes of the video conferencing application by determining a meeting state, which can be used by the automated testing system to calculate metrics and/or performance values to infer what experience a human participant would have in the meeting.

The present disclosure provides a number of technical effects and benefits. As one example of technical effect and benefit, the systems and methods of the present disclosure enable the conservation of computing resources. In particular, by having one centralized cloud infrastructure of meeting bots, the systems and methods of the present disclosure enable different developers to make available limited computing resources that would otherwise have been reserved for testing purposes. Additionally, techniques described herein enables reduction of network communications by allowing the meeting bots to periodically send status reports to the automated testing system. By periodically testing the video conference system, the automated testing system can proactively send alerts to developers if performance issues arise. Furthermore, by automatically generating different testing scenarios, the system saves time and computing resources that would have otherwise been needed by the developer to manually create the different testing scenarios. Improved performance of the video conferencing system conserves computational resources such as processor usage, memory usage, network bandwidth, etc.

According to some embodiments, the automated testing system can perform system-level testing of a video conference to determine the performance of the video conferencing system based on the behavior of meeting participants. In some instances, the behavior (e.g., which participants are presented when a large number (e.g., 100s, 1000s) of participants are in the video conference) can be dependent on what each participant does. For example, the video conferencing system can present the most recent speakers in the video conference. The automated testing system allows the testing of the video conference in a repeatable manner by using meeting bots. An API user can request meeting bots from a bot service. The bot service can be running on cloud infrastructure. The meeting bots can be headless participants that transmit media streams into the video conference. The media streams can be of a recorded person or a computer-generated media that is automatically generated by the bot service. The API user can control the meeting bots to perform actions (e.g., raising hands, exchanging messages, speaking in the video conference) that a human participant can perform in the video conference.

The automated testing service can coordinate the plurality of meeting bots that join the video conference. The coordination includes having a meeting bot perform a specific action based on a request from the API user. The automated testing service can run these types of tests and collect metrics data to determine the performance of the video conference. For example, if there are performance issues (e.g., video lagging, audio lagging, meeting bots being inadvertently removed from the video conference, low resolution of the video stream), the performance issues can be derived from the collected metrics data.

In some instances, the testing can be performed in a real running video conference with live human participants in order to verify interactions between the subcomponents of the video conferencing system. The meeting bots can add load (e.g., by joining additional meeting bots to the video conference) to the video conference to stress test the limits of the video conferencing system. Additionally, the meeting bots can add inputs to the video conference to determine and access if the video conferencing system performed as expected. The metrics data collected by the automated testing system can be a proxy of a human participant's experience of the video conference. The metrics data can include potential error messages, type of media received, quality of media stream received, frame rate of the video received, resolution of the video received, audio bitrate received, and other media statistics data.

In some instances, one or more parameters (e.g., resolution, frames-per-second (FPS), audio bitrate) of the video conferencing system and/or video conference can be modified (e.g., adjusted based on the metric data and/or a performance value calculated by the automated testing system. The one or more parameters can be modified in real-time by using machine-learning techniques or can be modified in future versions of the video conferencing system by a developer.

The meeting bot is a headless client for the video conference. The meeting bot can collect media statistics data about the video conference to simulate how a human participant would perceive the performance of the video conference and/or video conferencing system. The meeting bot can perform all the actions that a real user is able to perform in a video conference.

In some implementations, a video conferencing system may have a large number (e.g., 100, 1000, 10000, or more) of meeting bots participating in a video conference. The automated testing system can manage and coordinate the interactions of the large number of meeting bots in the cloud infrastructure system. For example, a choreographer within the automated testing system can manage the different meeting bots that are participating in different video conferences. In some instances, the automated testing system can coordinate and manage a large number of meeting bots participating in a video conference that are dispersed globally. Additionally, the meeting bots can join the video conference with different computer attributes and network attributes. The computer attributes can include type of device (e.g., mobile device, laptop, tablet, wearable device), type of operating system, computer processing resources, video processing resources, memory resources, power resources, and so on. The network attributes can include type of wireless connection, wireless connection upload speed, wireless connection download speed, fluctuating network connection, network interruption, switching wireless connections, and so on.

Additionally, the automated testing system can include an API server. The API server can keep track of the meeting bots that are available in the cloud infrastructure. The API server verifies that each meeting bot can perform the actions necessary during a video conference and removes the meeting bots that cannot perform the actions necessary during a video conference. For example, the API server can remove a meeting bot from a list of available meeting bots if the meeting bot has computer attributes and network attributes below an attribute threshold. The API server can include a bot status database that keeps track of each meeting bot's status and attributes. As previously mentioned, each bot can have different computer attributes and different network attributes. Additionally, the status of the meeting bot can include whether the bot is available to join a video conference, currently participating in a video conference, or not available (e.g., meeting bot having technical issues). The meeting bots can send status reports to the API server, which can be stored in the bot status database.

For example, the meeting bots can periodically send status reports of the video conference to the API server. The API server can store the status reports in the bot status database. The status report can include information related to the video conference, such as the video conference crashing, the meeting bot not receiving the media stream, the meeting bot being removed from the video conference, the audio and/or video lagging, the video resolution being below the requested video resolution, and other video conference metrics data. The automated testing system can analyze the metrics data, as part of the post processing analysis, to determine the performance of the video conference. For example, the automated testing system can indicate to the API user that the video conferencing system was overloaded (e.g., binary rating) during the video conference or give a scale-rating (e.g., numerical) about the performance of the video conferencing system.

Moreover, the automated testing system can include a choreographer that request a meeting bot from the API server. The choreographer can utilize the requested meeting bot to perform actions during a video conference. For example, the choreographer can request a first set of meeting bots having a first computer attribute and a first network attribute. Additionally, the choreographer can request a second set of meeting bots having a second computer attribute and a second network attribute. In response to the request from the choreographer, the API server can select the meeting bots and coordinate communication between the selected meeting bots and the choreographer. The API server can transmit, to the choreographer, a list of available meeting bots for the choreographer to utilize during the video conference.

In one example, a choreographer can send a first request that a first set of meeting bots perform a first action (e.g., raise their hands). In response to the first request, the API server can select the meeting bots to perform the first action. The selection of the first set of meeting bots can be based on computer attributes, network attributes of the meeting bots, and the first action to be performed by the meeting bots. Additionally, the choreographer can request that a second set of meeting bots perform a second action (e.g., listen-only mode without transmitting media streams to the video conference). In response to the first request, the API server can select the meeting bots to perform the second action. The selection of the second set of meeting bots can be based on computer attributes, network attributes of the meeting bots, and the second action to be performed by the meeting bots. In this example, the second action requires less computational and network resources, and therefore the attributes (e.g., computer attributes and/or network attributes) for the second set of meeting bots can be lower than the attributes for the first set of meeting bots.

In some implementations, the choreographer can stress-test the video conferencing system to ensure that the video conferencing system performs correctly during different scenarios (e.g., video conference with a large number of participants performing different actions). For example, the choreographer can add load to the video conferencing system by adding more participants. The choreographer can include a control loop and add meeting bots periodically to a video conference to try to overload the video conferencing system. Additionally, in combination with adding more meeting bots, the choreographer can task different meeting bots to perform different actions (e.g., start speaking, raise hand, send a message to another participant). The different actions performed by the meeting bots can be randomized by the choreographer. The choreographer can task a first meeting bot to speak at a first time interval, and a second meeting bot to speak at a second time interval. As previously discussed, when a participant is a speaker, it can trigger the video conferencing system to present the speaker to all the other meeting participants. The choreographer can also determine the video resolution of the media stream associated with the speaker that is transmitted to the video conferencing system. The choreographer can also request, to the video conference system, the video resolution of the media stream that will be presented to the meeting bots in the video conference.

In some implementations, when the meeting bot joins the video conference, the meeting bot can request different parameters (e.g., video resolution, audio bitrate, FPS) associated with the media stream that will be received by the meeting bot. The choreographer can determine, using machine learning techniques, these different parameters in order to test the video conferencing system. The choreographer can generate a task list of actions to be performed by each meeting bot during the duration of the video conference. The task list can be generated using domain specific language (DSL). The task list can ensure repeatability for the testing by enabling the same testing events for different scenarios. For example, a first scenario can be an earnings report of a public company with five active speakers and thousands of meeting participants in a listen-only mode until a question-and-answer session when selected participants are allowed to speak and ask questions. By using DSL, the automated testing system enables a developer to use a testing scenario (e.g., first scenario) with just a few lines of code, when a similar testing scenario may have taken the developers several hours to create using conventional techniques.

In some implementations, the automated testing system can include an alert mechanism. The alert mechanism enables the automated testing system to schedule the testing of the video conference with pre-generated testing scenarios. For example, once a testing scenario (e.g., first scenario) is created, the automated testing system can save the testing scenario and run the testing scenario periodically. Additionally, the automated testing system can automatically send a notification (e.g., alert) to the developers when an issues arises (e.g., a parameter in the metrics data being below a threshold, status report received from meeting bots having an error alert, calculated performance value being below a threshold) with the video conference system. The alert mechanism can send an alert when the video conferencing system is performing below a performance baseline.

In some implementations, a parameter of the video conferencing system can be modified based on the alert received from the automated testing system. The parameter of the video conferencing system can include the resolution, FPS, and/or audio bitrate of the media streams that is transmitted by the video conferencing system to the meeting participants of the video conference. For example, the alert can be sent to a developer, and in response to receiving the alert, the developer can modify a parameter of the video conferencing system. Additionally, or alternatively, the parameter of the video conferencing system can be modified in real-time, by using machine-learning techniques, in order to improve the performance of the video conference.

In one example, an alert can be sent to the developer that the amount of time for a meeting bot to join the video conference is above the specific threshold amount of time. In response to the alert, the developer can optimize the design of the video conferencing system by removing bottlenecks that are found in the backend of the video conferencing system based on the alert. The developer can modify a parameter of the video conferencing system. In this example, in order to optimize the performance of the video conference, the developer can modify access patterns to a database when multiple meeting participants join the video conference at the same time. By modifying the access patterns to the database, it can improve the scenario when multiple meeting bots are competing for access to the same database in the video conferencing system at the same time.

With reference now to the Figures, example embodiments of the present disclosure will be discussed in further detail.

FIG. 1 depicts an example client-server environment 100 according to example embodiments of the present disclosure. The client-server environment 100 includes a client computing device 102, a server computing system 130, and an automated testing system 150 that are connected by and communicate through a network 180. Although a single client computing device 102 is depicted, any number of client computing devices 102 can be included in the client-server environment 100 and connect to server computing system 130 and/or automated testing system 150 over a network 180.

In some example embodiments, the client computing device 102 can be any suitable device, including, but not limited to, a smartphone, a tablet, a laptop, a desktop computer, a bot service, or any other computer device that is configured such that it can allow a user to participate in a video conference. The client computing device 102 can include one or more processor(s) 112, memory 114, an associated display device 120, a video conferencing application 122, and a camera 124, a microphone 126, and an audio playback device 128 (e.g., speaker(s) such as stereo speakers). Although a single client computing device 102 is depicted, any number of client computing devices 102 can be included in the client-server environment 100 and connect to server computing system 130 over a network 180.

The one or more processor(s) 112 can be any suitable processing device, such as a microprocessor, microcontroller, integrated circuit, or other suitable processing device. The memory 114 can include any suitable computing system or media, including, but not limited to, non-transitory computer-readable media, random access memory (RAM), read only memory (ROM), hard drives, flash drives, or other memory devices. The memory 114 can store information accessible by the one or more processor(s) 112, including instructions that can be executed by the one or more processor(s) 112. The instructions can be any set of instructions that when executed by the one or more processor(s) 112, cause the one or more processor(s) 112 to provide the desired functionality.

In particular, in some devices, memory 114 can store instructions for video conferencing (e.g., one or more video conferencing applications 122) between the client computing device 102, the server computing device 130, and/or automated testing system 150. The client computing device 102 can implement the instructions to execute aspects of the present disclosure, including directing communications with server computing system 130 and/or automated testing system 150, providing a video conferencing application 122 and/or video stream to a user, and/or generating and sending instructions to the server computing system 130 and/or automated testing system 150 requesting a new video stream for a display region.

It will be appreciated that the term "system" can refer to specialized hardware, computer logic that executes on a more general processor, or some combination thereof. Thus, a system can be implemented in hardware, application specific circuits, firmware, and/or software controlling a general-purpose processor. In one embodiment, the systems can be implemented as program code files stored on a storage device, loaded into memory and executed by a processor or can be provided from computer program products, for example computer executable instructions, that are stored in a tangible computer-readable storage medium such as RAM, hard disk, or optical or magnetic media.

Memory 114 can also include data 116, such as video conferencing data (e.g., captured at the client computing device 102 or received from the server computing system 130 and/or automated testing system 150), that can be retrieved, manipulated, created, or stored by the one or more processor(s) 112. In some example embodiments, such data can be accessed and displayed to one or more users of the client computing device 102 during a video conference or transmitted to the server computing system 130 and/or automated testing system 150.

The client computing device 102 can execute a video conferencing application 122. In one example, the video conferencing application 122 is a dedicated, purpose-built video conferencing application. In another example, the video conferencing application 122 is a browser application that executes computer-readable code locally (e.g., by processor(s) 112) to provide a video conference as a web application. The video conferencing application 122 can capture video, image, and/or audio data from a camera 124 and/or microphone 126. The video conferencing application 122 can transmit the captured data to the server computing system 130 and/or automated testing system 150. Additionally, or alternatively, in some implementations when the client computing device 102 is a bot service, the video conferencing application 122 can transmit previously recorded or automatically generated media data (e.g., audio, image, and/or video data) to the server computing system 130 and/or automated testing system 150. The client computing device 102 can receive, from the server computing system 130 and/or automated testing system 150, media data from one or more other participants of the video conference (e.g., other client computing devices 102). The client computing device 102 can then display the received image data to users of the client computing device 102 on associated display device 120. In some example embodiments, the camera 124 collects video and image data from one or more users. The camera 124 can be any device capable of capturing visual data. Additionally, in some example embodiments, the microphone 126 collects audio data from one or more users. The microphone 126 can be any device capable of capturing audio data. In one example, a webcam can serve as both a camera and a microphone.

More particularly, the client computing device 102 can receive one or more media (e.g., video, audio) streams from the server computing system 130 and/or automated testing system 150. The client computing device 102 can, as an example, display the received media streams in the associated display device 120 (e.g., a laptop display device, a smartphone display device, a communicatively connected display device, etc.).

Additionally, or alternatively, in some implementations, the client computing device 102 can generate a media stream and send the media stream to the server computing system 130 and/or automated testing system 150 via network(s) 180. In some instances, the client computing device 102 can capture a video stream using camera 124 (e.g., an integrated webcam, communicatively connected camera device, etc.) and audio stream using microphone 126 (e.g., an integrated microphone, communicatively connected audio device). In some instances when the client computing device 102 is a bot service, the client computing device 102 can transmit previously recorded or automatically generated media streams to the server computing system 130 and/or automated testing system 150. The client computing device 102 can encode the media streams (e.g., as specified by instructions 118).

In accordance with some example embodiments, the server computing system 130 can include one or more processor(s) 132, memory 134, and a video conferencing system 140. The memory 134 can store information accessible by the one or more processor(s) 132, including instructions 138 that can be executed by processor(s) and data 136.

The server computing system 130 can be in communication with one or more client computing device(s) 102 and/or automated testing system 150 using a network communication device that is not pictured. The network 180 can be any type of communications network, such as a local area network (e.g., intranet), wide area network (e.g., Internet), or some combination thereof. In general, communication between the client computing device 102, the automated testing system 150, and the server computing system 130 can be carried via network interface using any type of wired and/or wireless connection, using a variety of communication protocols (e.g., TCP/IP, HTTP, RTP, RTCP, etc.), encodings or formats (e.g., HTML, XML), and/or protection schemes (e.g., VPN, secure HTTP, SSL).

The server computing system 130 can include a video conferencing system 140. In some implementations, the video conferencing system 140 can be configured to facilitate operation of the video conferencing application 122 executed by one or more client computing devices 102 and/or automated testing system 150. As an example, the video conferencing system 140 can receive video streams from a plurality of client computing devices 102 and/or automated testing system 150 (e.g., via network 180) respectively associated with a plurality of video conference participants. The video conferencing system 140 can provide the video streams to each of the client computing devices 102 and/or the automated testing system 150. The video conferencing application 122 and/or the video conferencing system 140 can operate independently or collaboratively to perform any of the techniques described herein. In some implementations, the server computing system 130 can include an automated testing system 150.

In accordance with some example embodiments, the automated testing system 150 can include one or more processor(s) 152, memory 154, and a bot service 160. The memory 154 can store information accessible by the one or more processor(s) 152, including instructions 158 that can be executed by processor(s) and data 156.

The automated testing system 150 can be in communication with one or more client computing device(s) 102 and/or the server computing system 130 using a network communication device that is not pictured. The network 180 can be any type of communications network, such as a local area network (e.g., intranet), wide area network (e.g., Internet), or some combination thereof. In general, communication between the client computing device 102, the server computing system 130, and the automated testing system 150 can be carried via network interface using any type of wired and/or wireless connection, using a variety of communication protocols (e.g., TCP/IP, HTTP, RTP, RTCP, etc.), encodings or formats (e.g., HTML, XML), and/or protection schemes (e.g., VPN, secure HTTP, SSL).

The automated testing system 150 can be configured to facilitate operation of the video conferencing application 122 executed by one or more client computing devices 102. As an example, the automated testing system 150 can receive video streams from a plurality of client computing devices 102 (e.g., via network 180) respectively associated with a plurality of video conference participants. The video conferencing system can receive video streams from a plurality of client computing devices 102 (e.g., via network 180) respectively associated with a plurality of video conference participants. Additionally, the automated testing system 150 can receive video streams from server computing system 150 via network 180. The automated testing system 150 can provide the video streams to each of the client computing devices 102 and/or server computing system 150.

Figure 2:
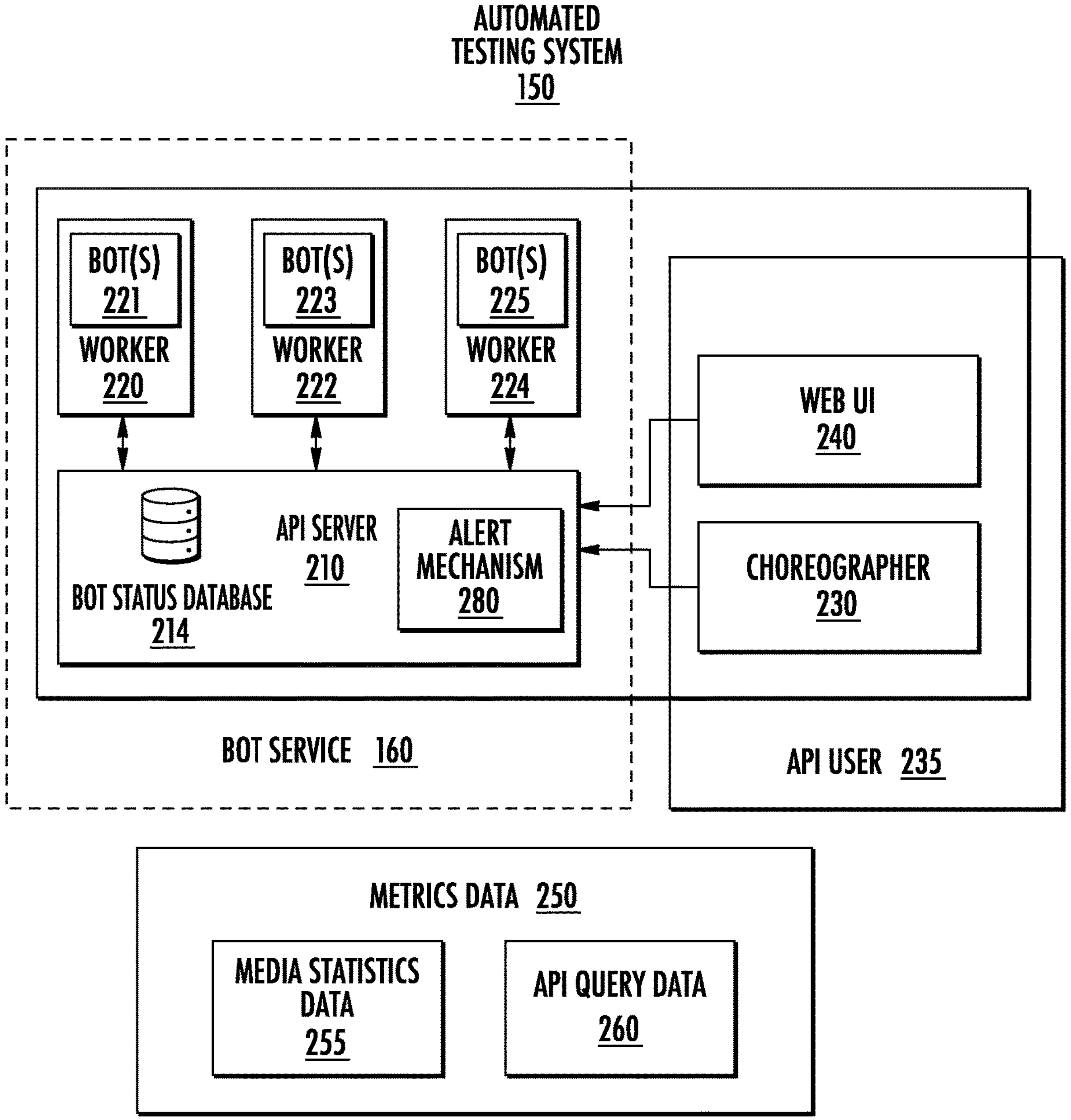
FIG. 2 depicts a block diagram of an example automated testing system according to example embodiments of the present disclosure.

FIG. 2 depicts a block diagram of an example automated testing system 150 according to example embodiments of the present disclosure.

In some implementations, the automated testing system 150 includes a bot service 160, a meeting choreographer 230, and a user interface 240. The bot service 160 can include an application program interface (API) server 210 to access and control worker nodes 220, 222, 224 that are geographically distributed. The meeting choreographer 230 can offer detailed control of how a meeting progresses and control all the bots. The user interface 240 (e.g., web user interface, mobile user interface) can offer ad hoc access to bots 221, 223, 225. For example, the user interface 240 can be designed for the use case that developers and testers are able to easily add bots 221, 223, 225 to a meeting, while for recurring tests, the meeting choreographer 230 can be used. The bot service 160 can further include an alert mechanism 280 that can alert a developer when the video conference system is performing below a performance baseline.

The bot service 160 can handle resources for both tests and developers that request bots 221, 223, 225 to join meetings. The resources can include digital workers 220, 222, 224 which can be tasked to start different kinds of meeting bots 221, 223, 225 (e.g., video conferencing application, Public Switched Telephone Network (PSTN) conferencing, etc.). For example, the bots 221, 223, 225 can be software robots that are task-centric, while the digital workers 220, 222, 224 can complete business functions from start to finish. Additionally, the bot service 160 can handle the permissions for both tests and developers that request bots 221, 223, 225 to join meetings. The permission can include limits on how many bots can be used, and with what authentication bots are joined.

The bot service can further include an application program interface (API) server 210. The API server 210 enables adding and controlling bots 221, 223, 225 for testing purposes. Additionally, the API server 210 can store a state associated with each worker and bot (e.g., availability of the workers 220, 222, 224, status of bots 221, 223, 225 that are participating in different meetings). When an API user 235 (e.g., the user interface 240, the choreographer 230) sends requests to add a bot to a meeting, the API-server 210 selects available workers 220, 222, 224 and sends commands to one or more bots 221, 223, 225 to join the meeting. After the one or more bots 221, 223, 225 are added to a meeting, the API user (e.g., the user interface 240, the choreographer 230) can send action commands to the API server 210, which can be transmitted to the bots 221, 223, 225.

The workers 220, 222, 224 can be distributed tasks that periodically report their status to the API server 210. For example, when the worker 220 gets a command to add bot 221 to a meeting (e.g., video conference), the worker 220 creates and joins bot 221 to the meeting with the requested configuration (e.g., type of audio/video to send). Subsequently, the worker 220 can receive commands for the bot 221. If the bot 221 leaves the meeting (e.g., because the bot is inadvertently removed from the meeting, error in the video conferencing system 140), the worker 220 sends periodic status reports to the API server 210. The periodic status report can include the cause of failure. The API server 210 can store these status reports in a bot status database 214. Additionally, the API users 235 can query the API server 210 for a bot status from the bot status database 214.

The automation testing system 150 further includes a user interface 240. In some instances, for ad hoc testing and interactive testing by quality assurance testers and developers, the user interface 240 enables a user (e.g., tester, developer) to interface with the bot service 160. By using the interface 240, a user can add and control bots 221, 223, 225 in a meeting. The user interface 240 allows interactive control of individual bots 221, 223, 225 as well as scripting functionality for more complex action patterns. Participants in a meeting can utilize the user interface 240 interactively in meetings used for manual QA of new features. Additionally, developers and engineers can use the user interface 240 while developing new features to test the new features.

The automation testing system 150 further includes a choreographer 230. In some instances, when running recurring tests of the conferencing system (e.g., video conferencing system 140), the actual scenario tested can be retested over time in a recurring interval. The choreographer 230 can control the bots 221, 223, 225 in a meeting by performing actions over a timeline. The choreographer 230 can determine and perform actions during the meeting at specific times during the meeting. Additionally, the choreographer 230 can perform these actions in a recurring pattern in order to collect performance data to be used as input in a regression detection model. Regression testing, but using a regression detection model, enables re-running functional and non-functional tests to ensure that previously developed and tested software still performs after a change.

In addition to performing predefined actions on a timeline, the choreographer 230 can keep track of the bots that are in a specific meeting and makes decisions based on this information. For example, the choreographer 230 ensures that the right number of participants are in the meeting while controlling which bot (e.g., bots 221, 223, 225) is speaking to emulate the patterns of real meetings. The choreographer 230 can utilize a control loop functionality to add the number of bots needed to hit the required participant count. The choreographer 230 can generate choreographed meetings to detect regressions in system performance. The choreographer 230 can provide developers with meetings to use to profile client performance. The choreographer 230 can create large meetings to perform load tests of the backend services. The choreographer 230 can provide meetings for third party hardware partners to test their hardware. For example, to improve the test environment for third-party entities (e.g., external testers), the automation testing system 150 can offer the external testers control of the bots in the meetings to test their third-party hardware.

In some implementations, the automation testing system 150 can obtain metrics data 250 to determine performance of the conferencing system. For example, different metrics are collected from the bots in choreographed meetings and are then used to detect regressions or identify areas to improve. The metrics data 250 can include media statistics data 255. The media statistics data 255 can describe the quality of audio and video data received by a participant. The media statistics data 255 can include audio rate, resolution of a video stream, frames-per-second (FPS) rate of a video stream, and other media quality data. The media statistics data 255 can be used, by the automation testing system 150, to determine whether a participant had a good experience in the meeting. Additionally, the metrics data 250 can include API query data 260, such as API query latency data. Given that the bots 221, 223, 225 and the full clients (e.g., web clients, mobile clients) use the same APIs, the bots 221, 223, 225 can perform certain tasks in the meeting in order to determine the amount of time for performing a task. The API query data 260 can include the amount of time for a user to send a chat message, to raise their hands, join a meeting, and so on. When a meeting size grows large, such task times need to be tracked to ensure that users have a good experience.

Figure 3:
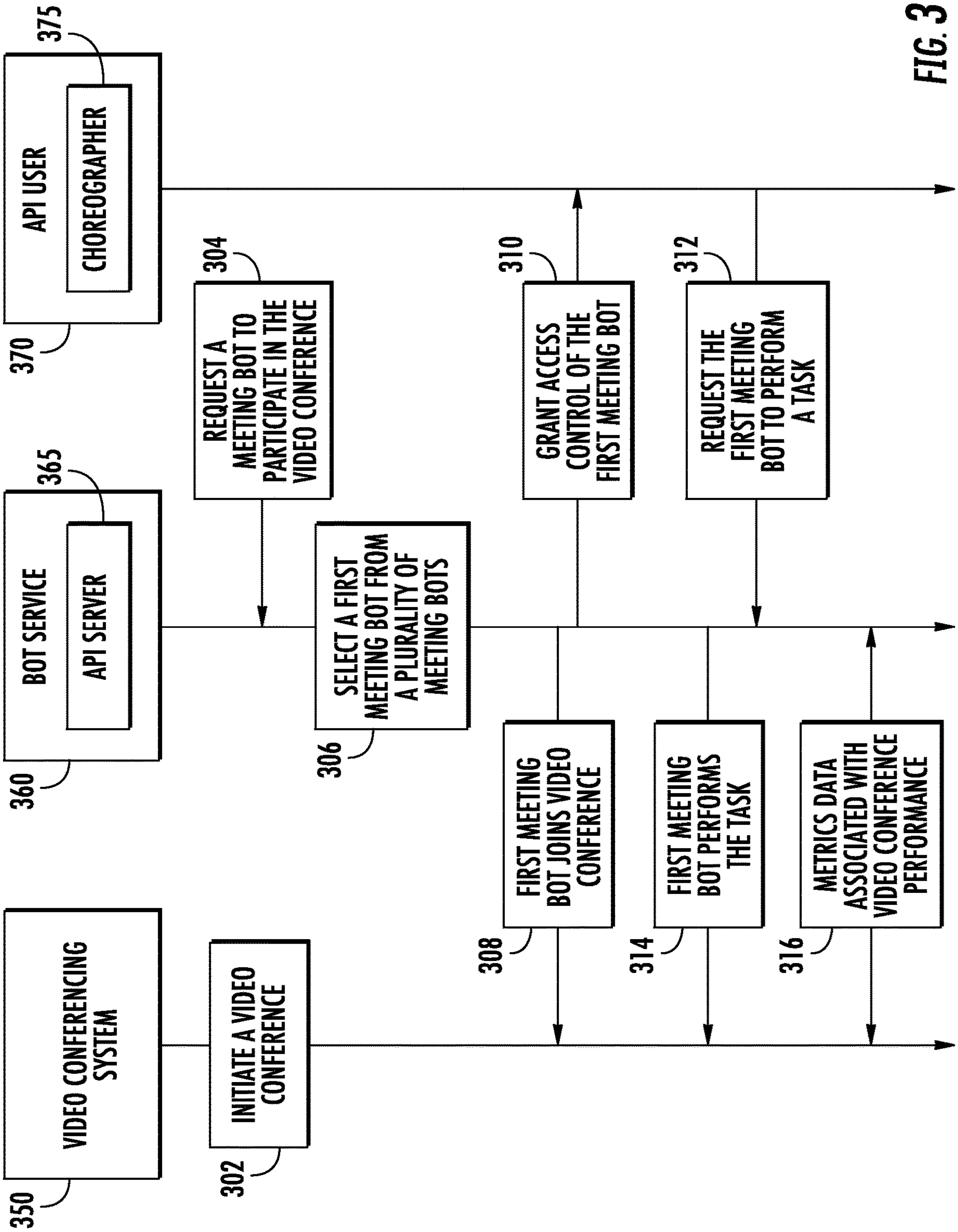
FIG. 3 depicts an example flow diagram of an example communication between a video conferencing system, a bot service, and an application program interface user according to example embodiments of the present disclosure.

FIG. 3 depicts an example multi-participant video conference with meeting bots according to example embodiments of the present disclosure.

In some implementations, a computing system that includes one or more computing devices can facilitate a video conference. For example, a video conference can be triggered in response to data descriptive of user input requesting initiation of a video conference. The video conference can include multiple participants. In particular, a video conferencing system can establish a video conference between multiple client devices (e.g., smartphones, laptops, etc.) that are associated with the multiple participants. In some implementations, one or more server computing devices can cooperatively operate to intermediate and facilitate communications between the client devices. Video conferencing system 350 (e.g., video conferencing system 140) can initiate a video conference at 302.

At 304, an API user 370 (e.g., API user 235) can request from a bot service 360 (e.g., bot service 160) a meeting bot to participate in the video conference. For example, the API user 370 can be a choreographer 375 (e.g., choreographer 230) that requests the meeting bot from the API server 365 (e.g., API server 210) of the bot service 360.

At 306, the bot service 360 can select a first meeting bot from a plurality of meeting bots.

At 308, the bot service 360 can join the first meeting bot into the video conference being organized by the video conference system 350.

At 310, the bot service 360 can grant access control of the first meeting bot to the API user 370.

At 312, the API user 370 can request the first meeting bot to perform a task. The request can be sent to the bot service 360, and the bot service can instruct the first meeting bot to perform the task.

At 314, the first meeting bot performs the requested task in the video conference.

At 316, the first meeting bot obtains metrics data associated with the performance of the video conference. The metrics data can be stored in the automated testing system. Subsequently, the automated testing system can perform an action based on post-processing evaluation of the metrics data.

Figure 4:
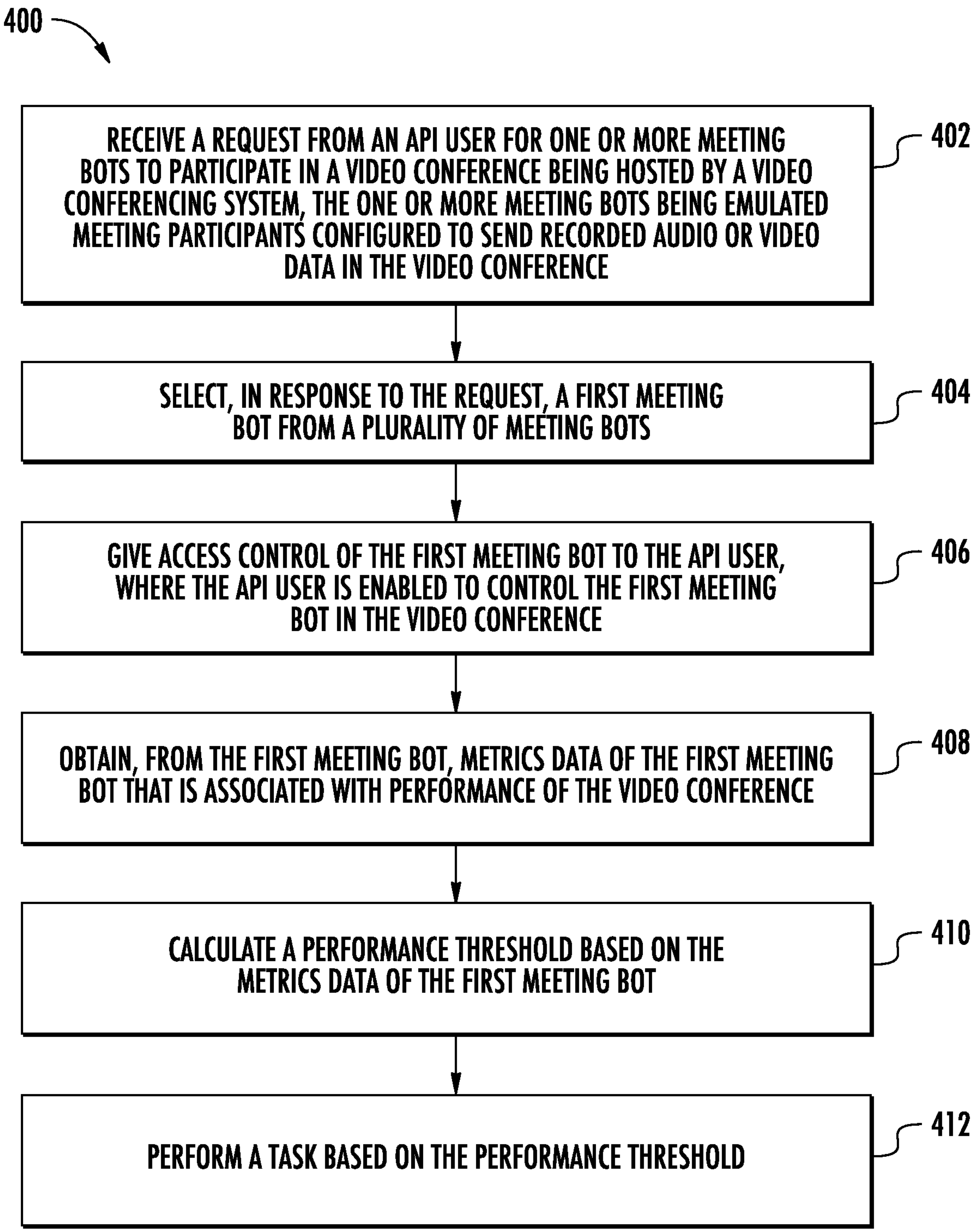
FIG. 4 is a flowchart depicting an example method of testing a video conferencing system in accordance with example embodiments of the present disclosure.

FIG. 4 depicts a flow chart diagram of an example method to improve performance in a video conferencing system by using an automated testing system according to example embodiments of the present disclosure. Although FIG. 4 depicts steps performed in a particular order for purposes of illustration and discussion, the methods of the present disclosure are not limited to the particularly illustrated order or arrangement. The various steps of method 300 can be omitted, rearranged, combined, and/or adapted in various ways without deviating from the scope of the present disclosure.

At 402, a computing system can receive a request from an application program interface (API) user for one or more meeting bots to participate in a video conference. The video conference can be hosted by a video conferencing system. The computing system can include one or more computing devices. The one or more meeting bots can be emulated meeting participants configured to send recorded audio or video data in the video conference.

In some implementations, the API user is an automated choreographer that runs recurring tests of the video conferencing system.

In some implementations, the API user is a developer of the video conferencing system that is testing a feature for the video conferencing system.

In some instances, the request from the API user can include a computer attribute of the first meeting bot. In some instances, the request from the API user can include a network attribute associated with a network connection of the first meeting bot. The computer attributes can include type of device (e.g., mobile device, laptop, tablet, wearable device), type of operating system, computer processing resources, video processing resources, memory resources, power resources, and so on. The network attributes can include type of wireless connection, wireless connection upload speed, wireless connection download speed, fluctuating network connection, network interruption, switching wireless connections, and so on.

At 404, the computing system can select, in response to the request at 402, a first meeting bot from a plurality of meeting bots. The plurality of meeting bots can be obtained based on information retrieved from the bot status database (e.g., bot status database 214). For example, the bot status database can include a table of meeting bots that are either available, currently in a video conference, or not available (e.g., due to technical issues). The bot status database can also store the computer attributes of each meeting bots and the network attributes of each meeting bots. In some instances, the first meeting bot can be selected from the plurality of meeting bots based on the network attribute of the first meeting bot and the network attribute included in the request received at 402. In some instances, the first meeting bot can be selected from the plurality of meeting bots based on the computer attribute of the first meeting bot and the computer attribute included in the request received at 402.

At 406, the computer system can grant access control of the first meeting bot to the API user, wherein the API user is enabled to control the first meeting bot in the video conference.

At 408, the computer system can obtain, from the first meeting bot, metrics data of the first meeting bot that is associated with performance of the video conference.

In some implementations, the metrics data can include media statistics data that describes a quality of audio data and a quality of video data received by the first meeting bot. For example, the media statistics data include an audio bitrate of the video conference, a resolution setting of the video conference, a frames-per-second (FPS) rate of the video conference, and/or a video bitrate of the video conference.

In some implementations, the metrics data include API query data that describes an amount of time for the first meeting bot to perform an action in the video conference. For example, the API query data includes an amount of time for the first meeting bot to send a chat message in the video conference, an amount of time for the first meeting bot to send a notification in the video conference, and/or an amount of time for the first meeting bot to join the video conference.

At 410, the computer system can calculate a performance value based on the metrics data of the first meeting bot.

At 412, the computer system can perform a task based on the performance value.

Figure 5:
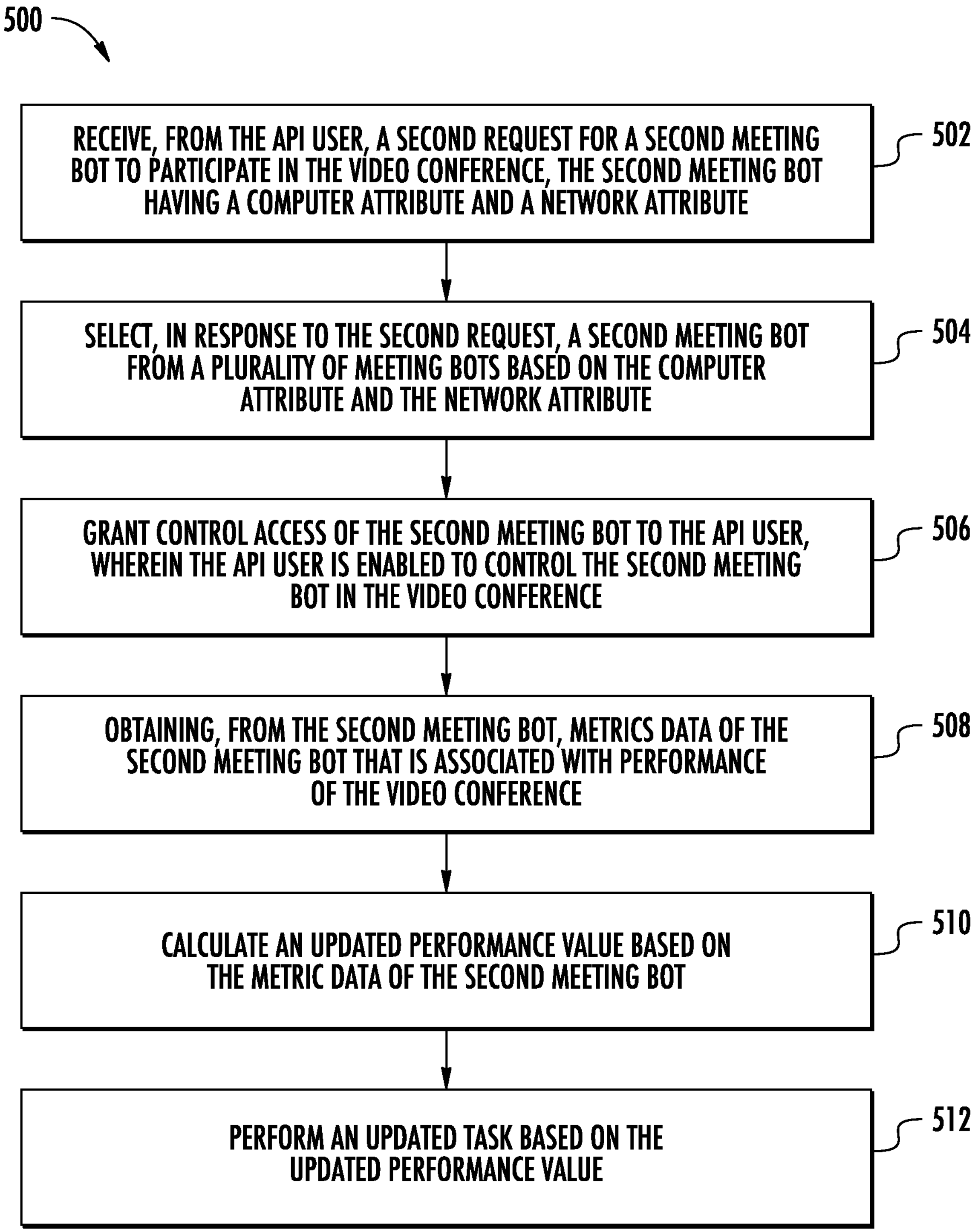
FIG. 5 is a flowchart depicting an example method of adding additionally meeting bots in a video conferencing system in accordance with example embodiments of the present disclosure.

FIG. 5 depicts a flow chart diagram of an example method to adding a plurality of meetings bot to a video conference according to example embodiments of the present disclosure. Although FIG. 4 depicts steps performed in a particular order for purposes of illustration and discussion, the methods of the present disclosure are not limited to the particularly illustrated order or arrangement. The various steps of method 500 can be omitted, rearranged, combined, and/or adapted in various ways without deviating from the scope of the present disclosure.

At 502, a computing system can receive, from the API user, a second request for a second meeting bot to participate in the video conference. The second request can have a second computer attribute and a second network attribute.

At 504, the computing system can select, in response to the second request, a second meeting bot from a plurality of meeting bots. The second meeting bot can be selected from the plurality of meeting bots based on the second computer attribute and/or second network attribute.

At 506, the computing system can grant control access of the second meeting bot to the API user. Based on the granted control access, the API user can be enabled to control the second meeting bot in the video conference.

At 508, the computing system can obtain, from the second meeting bot, metrics data of the second meeting bot that is associated with performance of the video conference.

In some implementations, the API user may request additional meeting bots to join the video conference. Method 500 can be similar to a for-loop algorithm, where operations 502, 504, 506, and 608 can be repeated for each additional meeting bot that is requested by the API user to be added to the video conference.

At 510, the performance value, which can be calculated at 410 in method 400, can be updated (e.g., modified) based on the metrics data of the second meeting bot. The computing system can calculate an updated performance value based on the metrics data received from the second meeting bot and any additional meeting bot (e.g., third meeting bot, fourth meeting bot, and so on) that subsequently joins the video conference based on a request from the API user.

At 512, the computer system can perform an updated task based on the updated performance value that is calculated at 510.

Figure 6:
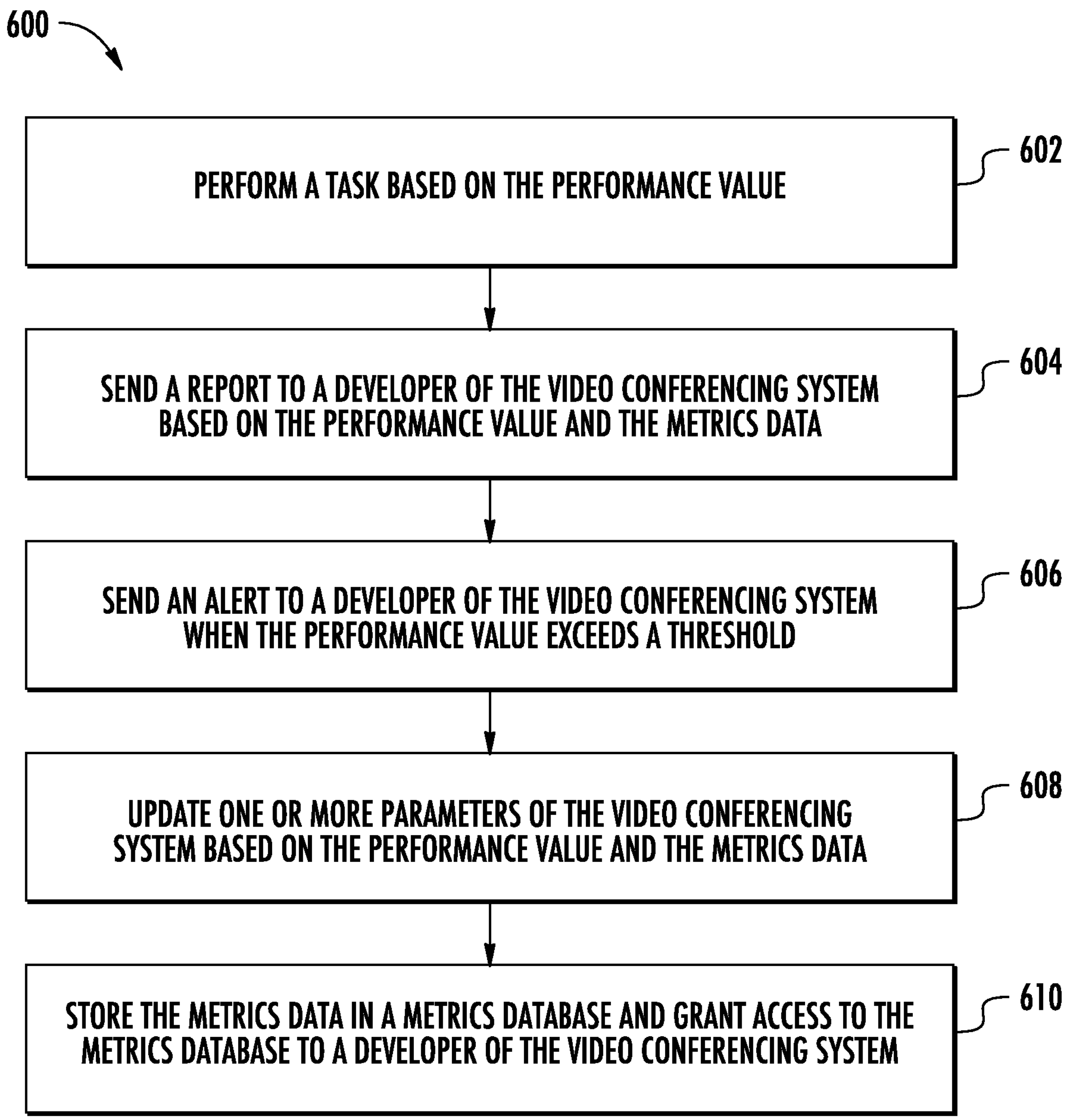
FIG. 6 is a flowchart depicting an example method of performing a task based on a performance value in accordance with example embodiments of the present disclosure.

FIG. 6 depicts a flow chart diagram of an example method to perform a task according to example embodiments of the present disclosure. Although FIG. 4 depicts steps performed in a particular order for purposes of illustration and discussion, the methods of the present disclosure are not limited to the particularly illustrated order or arrangement. The various steps of method 600 can be omitted, rearranged, combined, and/or adapted in various ways without deviating from the scope of the present disclosure.

At 602, a computing system can perform a task based on the performance value similar to the techniques described at 412 of method 400 and at 510 of method 500. The tasks performed by the computer system can be the operations described at operations 604, 606, 608, and/or 610.

In some implementations, at 604, the computer system can send a report to a developer of the video conferencing system based on the performance value and the metrics data.

Additionally, or alternatively, in some implementations, at 606, the computer system can send an alert to a developer of the video conferencing system when the performance value exceeds a threshold.

Additionally, or alternatively, in some implementations, at 608, the computer system can update one or more parameters of the video conferencing system based on the performance value and the metrics data.

Additionally, or alternatively, in some implementations, at 610, the computer system can store the metrics data in a metrics database. Furthermore, the computer system can grant access to the metrics database to a developer of the video conferencing system.

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

What is claimed is:

1. A computer-implemented method for improving performance in a video conferencing system, the method comprising:

receiving, by a computing system comprising one or more computing devices, a request from an automated choreographer for a meeting bot to participate in a video conference being hosted by a video conferencing system, the meeting bot being configured to send audio or video data in the video conference;

granting, by the computing system, access control of the meeting bot to the automated choreographer, wherein the automated choreographer is enabled to control the meeting bot in the video conference;

obtaining, from the meeting bot, metrics data of the meeting bot that is associated with performance of the video conference, wherein the metrics data include media statistics data that describes a quality of audio data and a quality of video data received by the meeting bot, wherein the metrics data include application programming interface (API) query data, wherein the API query data includes an amount of time for the meeting bot to send a chat message in the video conference, an amount of time for the meeting bot to send a notification in the video conference, or a duration of time required for the meeting bot to join the video conference;

calculating a performance value based on the metrics data of the meeting bot; and performing, by the computing system, a task based on the performance value, wherein the task performed includes updating one or more parameters of the video conferencing system based on the performance value.

2. The computer-implemented method of claim 1, wherein the meeting bot is selected from a plurality of meeting bots.

3. The computer-implemented method of claim 1, wherein the task performed includes:

sending a report to a developer of the video conferencing system based on the performance value and the metrics data.

4. The computer-implemented method of claim 1, wherein the task performed includes:

sending an alert to a developer of the video conferencing system when the performance value exceeds a threshold.

5. The computer-implemented method of claim 1, wherein the task performed includes:

updating one or more parameters of the video conferencing system based on the performance value and the metrics data.

6. The computer-implemented method of claim 1, wherein the task performed includes:

storing the metrics data in a metrics database; and granting access to the metrics database to a developer of the video conferencing system.

7. The computer-implemented method of claim 1, the method comprising:

receiving, from the API user, a second request for a second meeting bot to participate in the video conference;

selecting, in response to the second request, a second meeting bot from the plurality of meeting bots;

granting control access of the second meeting bot to the API user, wherein the API user is enabled to control the second meeting bot in the video conference;

obtaining, from the second meeting bot, metrics data of the second meeting bot that is associated with performance of the video conference; and wherein the performance value is further calculated based on the metrics data of the second meeting bot.

8. The computer-implemented method of claim 1, wherein the media statistics data include an audio bitrate of the video conference, a resolution setting of the video conference, a frames-per-second (FPS) rate of the video conference, or a video bitrate of the video conference.

9. The computer-implemented method of claim 1, wherein the automated choreographer executes recurring tests of the video conferencing system using the meeting bot, and wherein the automated choreographer is a different system from the video conferencing system.

10. The computer-implemented method of claim 1, wherein the API user is a developer of the video conferencing system that is testing a feature for the video conferencing system.

11. The computer-implemented method of claim 1, wherein the request includes a computer attribute of the meeting bot, and wherein the meeting bot is selected from the plurality of meeting bots based on the computer attribute.

12. The computer-implemented method of claim 1, wherein the request includes a network attribute associated with a network connection of the meeting bot, and wherein the meeting bot is selected from the plurality of meeting bots based on the network attribute.

13. A computing system, comprising:

one or more processors; and one or more non-transitory, computer-readable media that store instructions that when executed by the one or more processors cause the computing system to perform operations, the operations comprising:

receiving, by the computing system, a request from an automated choreographer for a meeting bot to participate in a video conference being hosted by a video conferencing system, the meeting bot being configured to send audio or video data in the video conference;

granting, by the computing system, access control of the meeting bot to the automated choreographer, wherein the automated choreographer is enabled to control the meeting bot in the video conference;

obtaining, from the meeting bot, metrics data of the meeting bot that is associated with performance of the video conference, wherein the metrics data include media statistics data that describes a quality of audio data and a quality of video data received by the meeting bot, wherein the metrics data include application programming interface (API) query data, wherein the API query data includes an amount of time for the meeting bot to send a chat message in the video conference, an amount of time for the meeting bot to send a notification in the video conference, or a duration of time required for the meeting bot to join the video conference;

calculating a performance value based on the metrics data of the meeting bot; and performing, by the computing system, a task based on the performance value, wherein the task performed includes updating one or more parameters of the video conferencing system based on the performance value.

14. The computing system of claim 13, wherein the task performed is sending an alert to a developer of the video conferencing system when the performance value exceeds a threshold.

15. The computing system of claim 13, wherein the metrics data include API query data that describes an amount of time for the meeting bot to perform an action in the video conference, and wherein the API query data includes an amount of time for the meeting bot to send a chat message in the video conference, an amount of time for the meeting bot to send a notification in the video conference, or an amount of time for the meeting bot to join the video conference.

16. The computing system of claim 13, wherein the metrics data include media statistics data that describes a quality of audio data and a quality of video data received by the meeting bot, and wherein the media statistics data include an audio bitrate of the video conference, a resolution setting of the video conference, a frames-per-second (FPS) rate of the video conference, or a video bitrate of the video conference.

17. One or more non-transitory computer-readable media that store instructions that, when executed by one or more processors of a computing system, cause the computing system to perform operations comprising:

receiving a request from an automated choreographer for a meeting bot to participate in a video conference being hosted by a video conferencing system, the meeting bot being configured to send audio or video data in the video conference;

granting, by the computing system, access control of the meeting bot to the automated choreographer, wherein the automated choreographer is enabled to control the meeting bot in the video conference;

obtaining, from the meeting bot, metrics data of the meeting bot that is associated with performance of the video conference, wherein the metrics data include media statistics data that describes a quality of audio data and a quality of video data received by the meeting bot, wherein the metrics data include application programming interface (API) query data, wherein the API query data includes an amount of time for the meeting bot to send a chat message in the video conference, an amount of time for the meeting bot to send a notification in the video conference, or a duration of time required for the meeting bot to join the video conference;

calculating a performance value based on the metrics data of the meeting bot; and performing, by the computing system, a task based on the performance value, wherein the task performed includes updating one or more parameters of the video conferencing system based on the performance value.

18. The computer-implemented method of claim 1, wherein the metrics data is a proxy of a human participant's experience of the video conference.

19. The computer-implemented method of claim 1, wherein the API query data includes a duration of time required for a second meeting bot to join the video conference.

* * * * *